United States Patent

Rogers

[15] 3,694,775

[45] Sept. 26, 1972

[54] MATRIX SWITCHING SYSTEM HAVING ITERATIVELY TERMINATED TRANSMISSION LINE

[72] Inventor: Stanley Rogers, La Jolla, Calif.

[73] Assignee: General Dynamics Corporation, San Diego, Calif.

[22] Filed: March 29, 1971

[21] Appl. No.: 129,087

[52] U.S. Cl. ........................333/7, 333/9, 340/166 R

[51] Int. Cl. ..............................................H01p 1/10

[58] Field of Search ............333/7, 8, 9; 317/101 CE; 200/51.04, 51.05, 153 S; 340/166 R

[56] References Cited

UNITED STATES PATENTS

| | | | |
|---|---|---|---|
| 2,664,546 | 12/1953 | Goodale | 333/8 |
| 3,354,435 | 11/1967 | Picciano | 333/7 X |
| 3,470,499 | 9/1969 | Lentz | 333/8 X |
| 2,958,054 | 10/1960 | Concelman | 333/7 |
| 3,529,264 | 9/1970 | Lancaster | 333/8 X |
| 3,280,267 | 10/1966 | Feucht | 340/166 R X |

*Primary Examiner*—Paul L. Gensler
*Attorney*—John R. Duncan

[57] ABSTRACT

An iteratively terminated or "tapered" transmission line is disclosed which is suitable for high frequency matrix switch application. The transmission lines interconnecting successive terminating impedances each have a characteristic impedance equal to the impedance in which it is effectively terminated. This arrangement allows the terminating impedances to be irregularly spaced along the tapered line and prevents signal reflections from occurring at any termination point, improving the stability of response when frequency changes and when either the number or the configuration of crosspoint closures changes.

6 Claims, 4 Drawing Figures

INVENTOR.
STANLEY ROGERS

BY John R Duncan

ATTORNEY

INVENTOR.
STANLEY ROGERS
BY
John R Duncan
ATTORNEY

MATRIX SWITCHING SYSTEM HAVING ITERATIVELY TERMINATED TRANSMISSION LINE

BACKGROUND OF THE INVENTION

In electrical transmission lines carrying wide-band high-frequency signals, problems occur where it is necessary to feed equal signals to each member of a linear array of output points when the output points are spaced too far apart to be treated as though they were in parallel. Such a situation often is present in matrix switches. Matrix switches generally comprise a rectangular array of switches, one side of the switches being connected to input lines or buses and the other side to output buses. The switch array permits any of the input buses to be electrically connected to any of the output buses, as desired. Conveniently, the input buses are thought of as forming the rows of the matrix, with the output buses forming columns. The switches are located at the intersections of crosspoints of the rows and columns.

Matrix switches are widely used in telephony, digital computer applications and analog or video transmission systems. Simple switch arrangements, such as the well-known "crossbar" switch, are useful in telephony, where low frequencies are used. Also, few problems arise in narrow-band matrix switch applications, since the system may be "tuned" for the specific signal frequency to be applied. However, many complex and interrelated problems arise where the matrix switch system must handle very-high-frequency broad-band signals such as video or certain digital signals.

In broad-band high-frequency matrix switches it is often desirable to be able to connect from 1 to *n* of the outputs to any one input bus while maintaining a constant signal level at all points on the input bus and providing a constant signal level at the terminus of each output. The uniformity of signal levels should not be affected by the number or configuration of the outputs connected to the input bus or by the frequency of the signal. Group delay differences for signals passing through different crosspoints and the change in delay experienced by any given signal because of changes in the pattern of crosspoint switch closures in the matrix switch should be minimized. The amount of crosstalk between independent circuits through switches should also be minimized.

With the ordinary uniform transmission line or input bus along which a number of uniform impedances are located at crosspoints, effective impedance mismatches occur, since the impedance the propagating signal "-sees" changes as it moves from crosspoint to crosspoint along the transmission line or bus. These mismatches result in standing waves forming on the line, caused by signal reflections from the impedance changes at the mismatch points. While such a uniform line is satisfactory at frequencies low enough so that the distance (in electrical degrees) from the first to the last crosspoint (each with its loading resistor) along the input bus is so small that the resistors appear to be in parallel, at higher frequencies at which the resistors no longer appear to be in parallel serious energy reflections occur. The resulting standing waves distort the signal passing through the system.

Thus, there is a continuing need for transmission line improvements as operating frequencies increase, especially in high-frequency broad-band matrix switches.

Summary of the Invention

It is, therefore, an object of this invention to provide a transmission line arrangement overcoming the above noted problems.

Another object of this invention is to provide a matrix switch useful with wide frequency bands at the higher frequencies.

Still another object of this invention is to provide means for terminating each portion of a transmission line connecting an iteratively disposed array of terminating impedances located at crosspoints in an impedance that exactly matches its characteristic impedance.

Yet another object of this invention is to eliminate standing waves and voltage non-uniformity on a matrix switch input bus.

The above objects, and others, are accomplished in accordance with this invention by terminating each portion of the transmission line connecting the iteratively disposed array of terminating impedances in an impedance that exactly matches the characteristic impedance of each such portion.

The impedance of the transmission line may be varied in any suitable manner to achieve the matching impedance effect. For example, the impedance of standard coaxial cable is generally 50 or 75 ohms, which could be changed by changing either the dielectric material or by changing the ratio of outer conductor diameter to inner conductor diameter. Typically, a shift from an air to a fluorocarbon dielectric may produce a 2:1 change in impedance. Since the impedance of a standard coaxial cable using an air dielectric is equal to 138 times the logarithim of the ratio of outer conductor diameter to inner conductor diameter, changing either of these diameters will change the impedance of the transmission line. These or any other suitable techniques may be used to vary the impedance of portions of a line in a matrix switch to achieve impedance matching.

While this invention is useful over a wide range of frequencies, it is generally of maximum benefit in applications involving frequencies over 50 MHz wherein the electrical distance between adjacent crosspoints cannot be neglected, as it often can be at lower frequencies. In many cases, this invention has highly desirable advantages in applications involving a very wide range of frequencies, e.g., from a few cycles per second to over 50 MHz.

BRIEF DESCRIPTION OF THE DRAWING

Details of the invention, and a preferred embodiment thereof, will be further understood upon reference to the drawings, wherein.

Detailed Description of the Invention

Figure 1:
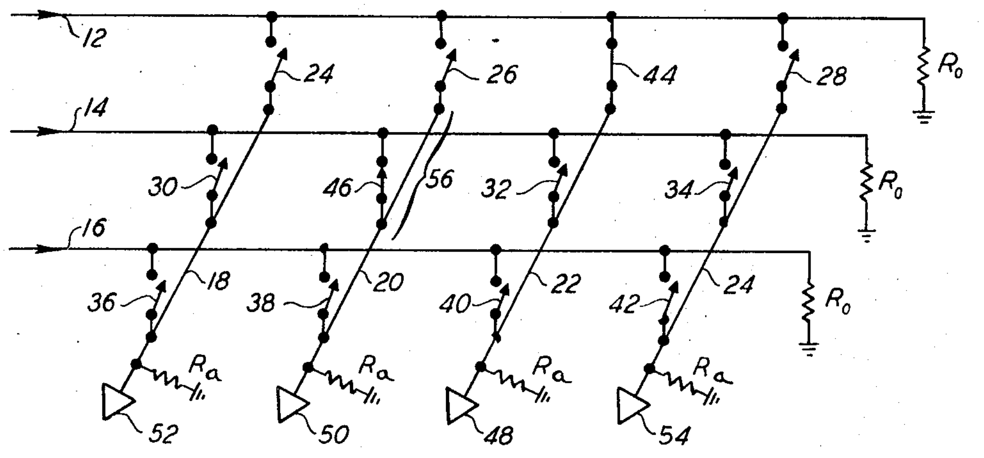
Prior Art FIG. 1
FIG. 1 is a schematic isometric representation of a prior art matrix switch illustrating problems overcome by this invention.

Referring now to FIG. 1, there is seen a simple schematic representation of a matrix switch in which the present invention can be applied. The inventive features, as shown in FIG. 2 replace or add to portions of the switch of FIG. 1. The inventive features are shown in the form of single input-bus elements in FIG. 2, since to show an entire switch (as in FIG. 1) incorporating these novel features at every crosspoint would be unduly confusing, since the complex three-dimensional array must be illustrated in two dimensions.

As shown in FIG. 1, a typical matrix switch comprises a number of input lines or buses 12, 14 and 16 and a number of output lines or buses 18, 20, 22 and 24. The input and output buses are conveniently illustrated as rows and columns, respectively. Of course, more or fewer input and output buses may be included, as desired.

Wherever input and output buses cross, an interconnecting crosspoint switch is provided. Any of the input buses thus may be connected to any of the output buses. As seen in FIG. 1, crosspoint switches 24, 26, 28, 30, 32, 34, 36, 38, 40 and 42 are open, while switches 44 and 46 are closed. Thus, a signal entering on input bus 12 will pass through crosspoint switch 44 and reach output amplifier 48 on output bus 22. Similarly, a signal entering on input bus 14 will pass through crosspoint switch 46 and output bus 20 to output amplifier 50. Since none of switches 24, 30 and 36 are closed, no signal will reach output amplifier 52. Similarly, with switches 28, 34 and 42 all open, no signal will reach output amplifier 54. Also, since none of switches 36, 38, 40 and 42 are closed, a signal entering on input bus 16 will not reach an output amplifier.

Each input bus is terminated in a matching resistor $R_o$, which is equal to the characteristic impedance of the line. The input impedance of each amplifier is $R_a$, which is very large when compared to $R_o$. Where the input bus is thus "matched," no signal energy is reflected back from the termination toward the input end of the bus. Such a bus has the desirable characteristic of having the same voltage at all points along the bus when a constant signal is applied at the input.

As seen in FIG. 1, each input bus is properly terminated so that no signal energy is reflected from $R_o$ back toward the source of energy, so long as all crosspoint switches are open, as is the case with input bus 16.

However, a line terminated in anything other than its characteristic impedance will have "standing waves" in it, resulting from signal energy reflections from a mismatched termination. If the impedance changes at any point along a transmission line, reflections of signal energy will occur at each such point, setting up standing waves on the line. When a crosspoint switch is closed, an output bus is added to the circuit. For example, when switch 46 is closed, output bus 20 is added to the circuit of input bus 14. The bracketed portion 56 along output bus 20 is an unterminated "stub." The resulting standing waves caused by signal energy reflected from the end of stub portion 56 causes voltage non-uniformity along input bus 14 and output bus 20. Thus, as different cross-point switches are opened and closed, the signal reaching the output amplifiers will be distorted i.e., will change in amplitude as frequency changes and as the pattern of crosspoint closures changes.

Figure 2A:
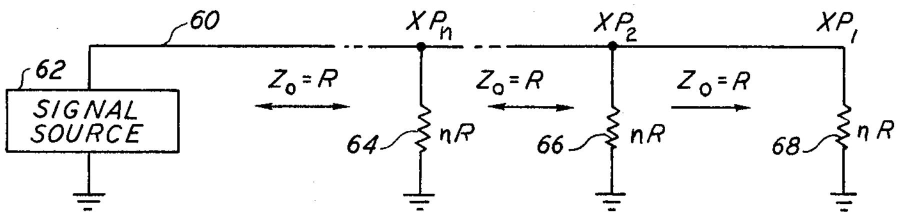
FIGS. 2*a* and 2*b* are schematic representations of a portion of a transmission line illustrating iterative terminations.

If the input buses of FIG. 2a were center-fed (instead of being fed from one end as shown) and if the sections of input bus 60 between crosspoints can be made electrically short enough, half the crosspoints may be regarded as in parallel at each end of the bus, so that the impedance of the input bus may be made equal to twice the resistance of all the crosspoint loads in parallel. However, in many applications, especially with very-high-frequency signals, the sections of the input bus between crosspoints are electrically long enough (though small compared to 90 electrical degrees) that they must be treated as transmission lines and the crosspoint loads cannot be treated as if in parallel. In this situation, the problems caused by the mismatch, and the novel solution thereto, are illustrated in FIGS. 2a and 2b. *n*

Figure 3:
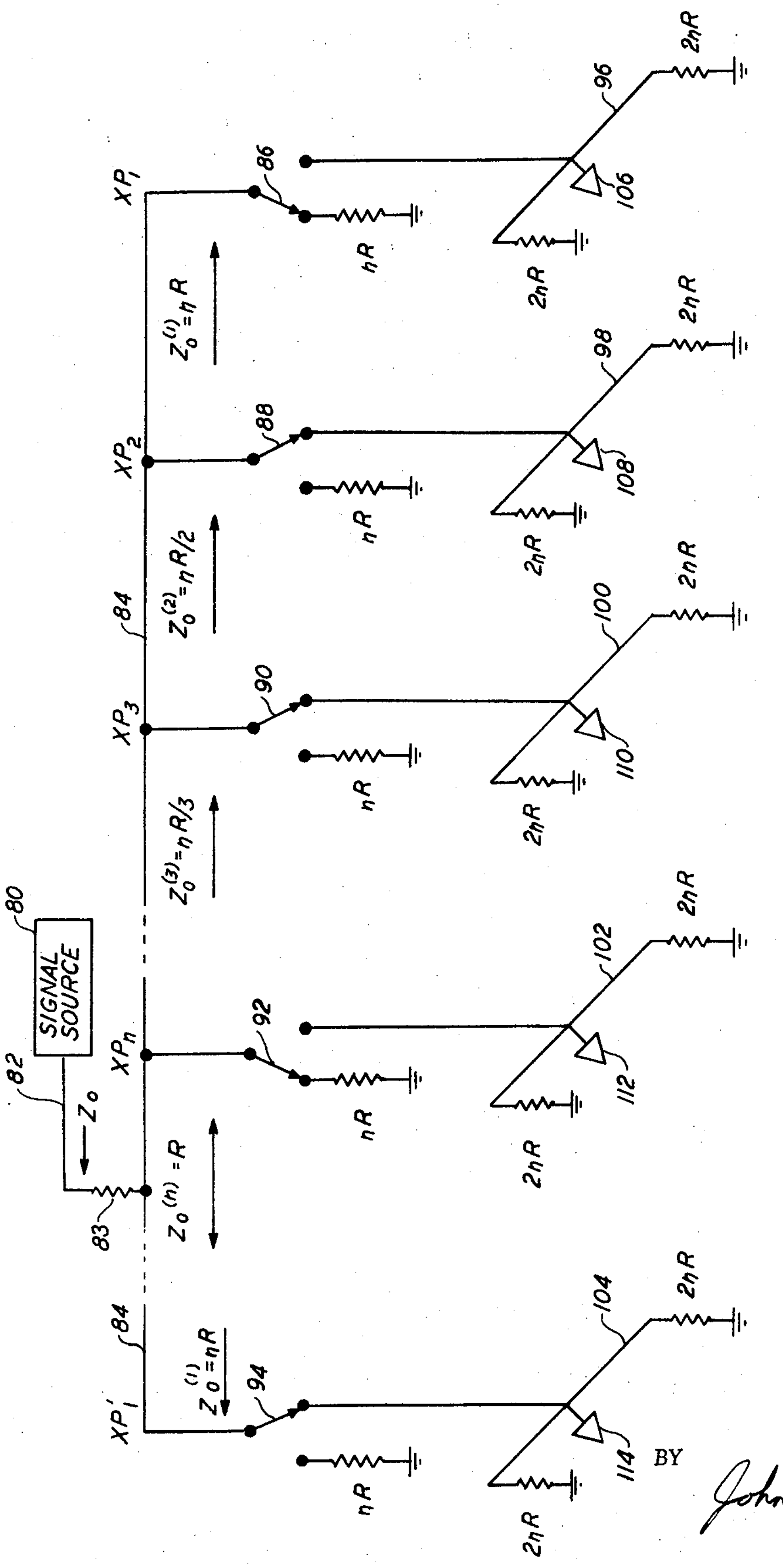
FIG. 3 is a schematic isometric representation of a portion of a matrix switch illustrating a preferred embodiment of the invention.

FIG. 2a illustrates an iterative termination of a uniform transmission line in which all the terminations (for convenience) have the same value. Line 60 may be an input bus corresponding to any one of buses 12, 14 and 16 in FIG. 1. A signal from a signal source 62 passes through any or all of "*n*" crosspoints, each with its terminating impedance e.g., 64, 66 and 68) each of which has an impedance of "$nR$". The terminating impedance may typically be the input impedance of an output bus as shown in FIG. 3 when the crosspoint switch is closed, or may be a dummy load when the switch is open, as discussed in detail below. The characteristic impedance of the line is $Z_o = R$, a pure resistance.

With a uniform line or input bus as shown in FIG. 2a, the last section (that between crosspoint $XP_2$ and crosspoint $XP_1$) is mismatched because its terminating resistor has n times the resistance needed for matching. Because of the standing waves created by this mismatch, at crosspoint $XP_2$ the impedance seen looking toward $SP_1$ appears smaller than $nR$ and it typically has a capacitive component. This effect is compounded as one moves toward crosspoint $XP_n$. The net effect is standing voltage waves between the crosspoints and some standing waves all the way back to the signal source. With a uniform transmission line, iterative termination is therefore unsatisfactory at high frequencies. At lower frequencies, this arrangement is acceptable if the distance from the first to the last crosspoint is so small in electrical degrees that the terminating resistors appear to be in parallel.

Figure 2B:
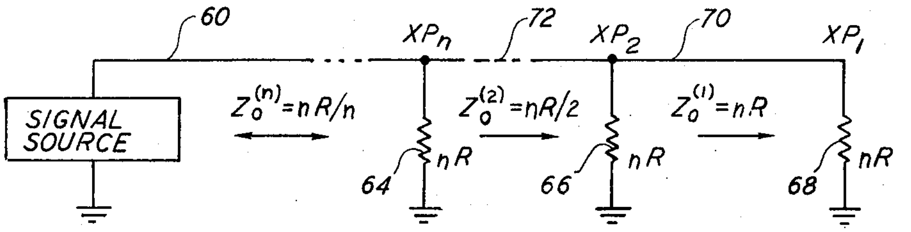

By modifying the transmission line impedance section-by-section as illustrated in FIG. 2b, a matching iterative termination system is provided that will work at high frequencies where the distance between successive crosspoints is large enough in electrical degrees to require treating each section as a separate transmission line. (Again, for convenience, the iterative terminations shown are all equal.) The sections may be of any length, with essentially no reflections at any frequency, with the result that the line is "flat,"i.e., free from amplitude distortion).

The components shown in FIG. 2b are arranged as in FIG. 2a, except that the impedance of the line changes systematically in the different sections of the input bus.

In section 70 (between crosspoints $XP_1$ and $SP_2$) the characteristic impedance is $Z_o^{(1)}$, which equals nR.

Since nR is the terminating impedance 68, the section is matchnterminated and there will be no reflection. Also, at the input of this section, the impedance seen in $nR$. At this point ($XP_2$), there is another resistor 66 having a value $nR$ going from the crosspoint to ground. The parallel combination of resistor 66 with section 70 ($nR$ in parallel with $nR = nR/2$) is the termination for section 72 of the transmission line. Hence, the impedance of the line in section 72 is chosen to be $nR/2$ so that it is terminated in a matching impedance.

Each further section of the line is designed analogously. Thus the $n^{th}$ section has a characteristic impedance of $R$, and perfect matching is obtained at all crosspoints.

As discussed above, the impedance may be changed from section to section in any conventional way, such as by changing the ratio of outer-to-inner conductor diameters in coaxial lines or by changing the dielectric used in any transmission system, or by other well-known means for other types of transmission lines.

An especially preferred embodiment of the invention, including several preferred features, is illustrated in FIG. 3.

As seen in FIG. 3, the signal from source 80 enters on input line 82, which feeds the center of input bus 84. This center-fed input bus 84 has the advantage that the maximum propagation delay through the matrix switch is smaller than if the input bus were fed at any other point. A resistor 83 in input line 82 forms the upper leg of a voltage divider and input-bus impedance reducer in combination with the two branches of input bus 84 which together form the lower leg. Resistor 83 isolates from signal source 80 any reflections that may occur on the input bus due to mechanical or other imperfections.

Crosspoint switches 86, 88, 90, 92 and 94 connect the input bus through crosspoints $XP_1$, $XP_2$, $XP_3$, $XP_n$ and $XP_1{}^1$, respectively, to either a dummy load nR or output buses 96, 98, 100, 102, or 104, and ultimately to associated output amplifiers 106, 108, 110, 112, or 114. The impedance of each dummy load, $nR$, is selected so as to be equal to the impedance of the actual load, which consists of the output bus system and the input impedance of the amplifier. With this arrangement, switching does not affect the voltages along input bus 84. With constant shunt impedance at the crosspoints, the input bus can be designed for minimum reflections and, therefore, for maximum voltage uniformity throughout its length. Each end of each output bus is terminated in a terminating resistor having an impedance $2nR$. This eliminates the unterminated stub that would be present (see, for example bracketed portion 56 in FIG. 1) if the output buses were terminated at one end only. Such unterminated stubs would produce strong signal reflections. The characteristic impedance of each output bus must be twice that which would be required if the bus had a conventional single termination, since at the point where the signal enters the output bus, it "sees" two paths of equal impedance. These paths are effectively in parallel so that half the signal goes each way. When the two half-energy signals reach the ends of the output bus, they are fully absorbed in the terminating resistors. Therefore, no signal energy is reflected and the voltage at all points on the output bus must be the same.

As discussed above with respect to FIG. 2a, the characteristic impedance of each section of input bus 84 between crosspoints is selected so that each section is match terminated.

As shown in FIG. 3, the section between $XP_1$ and $XP_2$ has a characteristic impedance $Z_o{}^{(1)} = nR$, matching terminating impedance $nR$ at switch 86. The section between $XP_2$ and $XP_3$ has a characteristic impedance $Z_o{}^{(2)} = nR/2$. It "sees" two impedances (terminating impedance at switch 88 and correctly terminated input-bus section between $XP_1$ and $XP_2$ of $nR$) in parallel and so is exactly matched. Similarly, the line at the input point where input line 82 connects to the center of input bus 84 has a characteristic impedance $Z_o{}^{(n)} = R$ since it sees n impedances of nR in parallel looking in either direction. Thus, it "sees" an effective impedance of $nR/n$, or $R$, and so is exactly matched. This "tapered" transmission line allows the terminating impedances to be irregularly spaced along the tapered line (input bus 84) and prevents reflections from occurring at any termination point, since the propagating signal never sees a mismatch.

In a typical system of the sort shown in FIG. 3, where there are five crosspoints on each side of the centered input 82, where there is 20 dB of attenuation between the input terminal and the output buses and where all the iterative terminating impedances are the same, then $Z_o = 50$ ohms, resistor 83 is 45 ohms, and $R = 10$ ohms. Each dummy load $nR$ is thus 50 ohms and each output bus termination $2nR$ is 100 ohms. The characteristic impedance of each section of input bus 84 is easily calculated: $Z_o{}^{(1)} = nR = 50$ ohms, $Z_o{}^{(2)} = nR/2 = 25$ ohms, $Z_o{}^{(3)} = nR/3 = 16\frac{2}{3}$ohms, etc.

Although specific components, combinations and arrangements have been mentioned in the above description of the invention and of a preferred embodiment thereof, other arrangements may be used, where suitable, with similar results.

Other modifications and applications of the present invention will occur to those skilled in the art upon reading the present disclosure. These are intended to be included within the scope of this invention, as defined in the appended claims.

I claim:

1. A wide-band high-frequency matrix switch comprising a plurality of input buses, each having a characteristic impedance at the signal input point of "$R$"; a plurality of output buses adjacent to said input buses; and a plurality of crosspoint switches including "$n$" crosspoint switches between the signal input to an input bus and the end of the input bus, each of which is effectively movable between a first position connecting an input bus to an output bus and a second position connecting the input bus to a dummy load the impedance of which is "$nR$", said dummy load having an impedance substantially equal to the impedance of the output bus; each section of the input buses between successive crosspoints constituting a transmission line having a characteristic impedance equal to "$nR$" divided by the serial number of the section counting from the end of the input bus toward the signal input points.

2. The matrix switch according to claim 1 wherein each end of each output bus is terminated in an impedance of 2nR.

3. The matrix switch according to claim 1 wherein said signal input points are substantially at the center of each of said input buses, with crosspoints spaced along the input buses on both sides of the signal input point.

4. A wide-band high-frequency matrix switch comprising a plurality of input buses, a plurality of output buses adjacent to said input buses and a plurality of crosspoint switches adapted to selectively connect crosspoints spaced along said input buses to crosspoints spaced along said output buses, each of said crosspoint switches being movable between a first position connecting an input bus to an output bus and a second position connecting the input bus to a dummy load, said dummy load having an impedance *nR* substantially equal to the termination impedance presented by the output bus, wherein there are n crosspoints between the signal input point on an input bus and the end of the input bus, R is the characteristic impedance of the input line at the signal input point, and the characteristic impedance of each of said transmission line sections is selected to be equal to nR divided by the serial number of the section counting from the end of the input bus back toward the signal input point.

5. The matrix switch according to claim 4 wherein each end of each output bus is terminated in an impedance of 2nR.

6. The matrix switch according to claim 4 wherein said signal input points are substantially at the center of each of said input buses, with crosspoints spaced along the input buses on both sides of the signal input point.

* * * * *